United States Patent
Bucheru et al.

(10) Patent No.: US 12,101,023 B2
(45) Date of Patent: Sep. 24, 2024

(54) LOW POWER PFC CONVERTER

(71) Applicant: Apple Inc., Cupertino, CA (US)

(72) Inventors: Bogdan T Bucheru, Lakeway, TX (US); Joao L Andres, Austin, TX (US); Marco A Davila, Jr., Spicewood, TX (US)

(73) Assignee: Apple Inc., Cupertino, CA (US)

(*) Notice: Subject to any disclaimer, the term of this patent is extended or adjusted under 35 U.S.C. 154(b) by 265 days.

(21) Appl. No.: 17/814,902

(22) Filed: Jul. 26, 2022

(65) Prior Publication Data
US 2024/0039398 A1 Feb. 1, 2024

(51) Int. Cl.
*H02M 1/42* (2007.01)
*H02M 1/00* (2006.01)
*H02M 3/335* (2006.01)

(52) U.S. Cl.
CPC ....... *H02M 1/4225* (2013.01); *H02M 1/0032* (2021.05); *H02M 1/0095* (2021.05); *H02M 3/33507* (2013.01)

(58) Field of Classification Search
CPC ............. H02M 1/4225; H02M 1/0032; H02M 1/0095; H02M 3/33507
See application file for complete search history.

(56) References Cited

U.S. PATENT DOCUMENTS

| | | | |
|---|---|---|---|
| 2005/0030772 A1* | 2/2005 | Phadke | H02M 1/4225 363/71 |
| 2012/0051097 A1* | 3/2012 | Zhang | H02M 3/3376 363/21.07 |
| 2021/0399643 A1* | 12/2021 | Oh | H02M 1/4258 |

* cited by examiner

*Primary Examiner* — Jue Zhang
*Assistant Examiner* — Afework S Demisse
(74) *Attorney, Agent, or Firm* — FLETCHER YODER PC

(57) ABSTRACT

A power converter can include an input PFC stage that receives a rectified input voltage coupled to a flyback stage including a center-tapped primary winding magnetically coupled to a secondary winding and a main switch coupled in series with the primary winding. The output of the PFC stage can be coupled to the center tap of the primary winding, and an output of the power converter can be coupled to the secondary winding of the flyback stage. The converter can further include control circuitry coupled to the main switch and an auxiliary switch in the PFC stage that operates the main switch to regulate an output voltage of the power converter, selectively enables the auxiliary switch responsive to a low line voltage condition at the input of the power converter, and operates the enabled auxiliary switch synchronously with the main switch.

21 Claims, 4 Drawing Sheets

LOW POWER PFC CONVERTER

BACKGROUND

Many electronic devices rely on AC-DC adapters to convert AC mains voltages to a DC voltage that may be used by the device for powering its systems, charging its battery, etc. In many applications, these adapters are based on DC-DC converters (for example, flyback converters) that convert the rectified AC mains voltage to a suitable DC voltage. In higher power applications, e.g., above about 65~75 W, additional power factor correction (PFC) stages may be provided to condition the line current seen on the AC mains side as to both power factor (phase angle difference between voltage and current) as well has harmonic content.

SUMMARY

In at least some applications, it may be desirable to provide similar PFC correction and the associated line current conditioning to lower power adapters/converters or converters at the boundary where power factor correction is required. Existing circuits and approaches may have a degree of complexity that renders them impractical due to size, cost, efficiency, complexity, and other constraints. Disclosed herein is an exemplary PFC converter that may advantageously be employed in various applications, including but not limited to lower power applications (e.g., below about 65~75 W).

A power converter can include a boost stage having a boost inductor, a boost diode, and an auxiliary switch. A first boost inductor terminal can be coupled to an input of the power converter that receives a rectified input voltage, and a second boost inductor terminal can be coupled to an anode of the boost diode and a first terminal of the auxiliary switch. The power converter can further include a flyback stage that includes a flyback transformer having a primary winding and a secondary winding and a main switch coupled in series with the primary winding that switches to alternately store energy from the input of the power converter in the flyback transformer and discharge energy from the flyback transformer to an output of the power converter via a rectifier coupled to the secondary winding. The primary winding can have a center tap and a cathode of the boost diode can be coupled to the center tap. The center tap can be at the midpoint of the primary winding. The power converter can further include a bulk capacitor coupled across the series combination of the primary winding and the main switch.

The power converter can further include control circuitry coupled to the main switch and the auxiliary switch that operates the main switch to regulate an output voltage of the power converter, selectively enables the auxiliary switch responsive to a low line voltage condition at the input of the power converter and disables the auxiliary switch responsive to a high line voltage condition at the input of the power converter, and operates the enabled auxiliary switch synchronously with the main switch. The control circuitry can operate the auxiliary switch synchronously with the main switch by turning on the auxiliary switch at the same time as the main switch. The control circuitry can operate the auxiliary switch synchronously with the main switch by turning off the auxiliary switch at the same time as the main switch. The control circuitry can operate the auxiliary switch synchronously with the main switch by turning off the auxiliary switch before turning off the main switch. The control circuitry can turn off the auxiliary switch responsive to one or more inputs including on time of the main switch; input line RMS, average, or peak voltage; instantaneous line voltage or line phase; bulk capacitor voltage; output voltage of the converter; load or feedback position; and converter switching frequency. The control circuitry can implement a quasi-resonant flyback controller.

A power converter can include a power factor correction stage having an input coupled to an input of the power converter that receives a rectified input voltage and an output and a flyback stage including a center-tapped primary winding magnetically coupled to a secondary winding and a main switch coupled in series with the primary winding. The output of the power factor correction stage can be coupled to the center tap of the primary winding and an output of the power converter can be coupled to the secondary winding of the flyback stage. The center tap can be at the midpoint of the primary winding. The power converter can further include control circuitry coupled to the main switch and an auxiliary switch in the power factor correction stage that operates the main switch to regulate an output voltage of the power converter, selectively enables the auxiliary switch responsive to a low line voltage condition at the input of the power converter, and operates the enabled auxiliary switch synchronously with the main switch.

The control circuitry can operate the auxiliary switch synchronously with the main switch by turning on the auxiliary switch at the same time as the main switch. The control circuitry can operate the auxiliary switch synchronously with the main switch by turning off the auxiliary switch at the same time as the main switch. The control circuitry can operate the auxiliary switch synchronously with the main switch by turning off the auxiliary switch before turning off the main switch. The control circuitry can turn off the auxiliary switch responsive to one or more inputs including on time of the main switch; input line RMS, average, or peak voltage; instantaneous line voltage or line phase; bulk capacitor voltage; output voltage of the converter; load or feedback position; and converter switching frequency. The control circuitry can implement a quasi-resonant flyback controller.

Controlling a power converter, the power converter having an input power factor correction stage coupled to an output flyback stage via a center-tapped primary winding of the flyback stage, can include operating a main switch associated with the flyback stage to regulate an output voltage of the power converter, selectively enabling an auxiliary switch associated with the power factor correction stage responsive to a low line voltage condition at the input of the power converter, and operating the enabled auxiliary switch synchronously with the main switch. Operating the auxiliary switch synchronously with the main switch can include turning on the auxiliary switch at the same time as the main switch. Operating the auxiliary switch synchronously with the main switch can include turning off the auxiliary switch at the same time as the main switch. Operating the auxiliary switch synchronously with the main switch can include turning off the auxiliary switch before turning off the main switch. Turning off the auxiliary switch can be responsive to one or more inputs including on time of the main switch; input line RMS, average, or peak voltage; instantaneous line voltage or line phase; bulk capacitor voltage; output voltage of the converter; load or feedback position; and converter switching frequency.

Operating a main switch associated with the flyback stage to regulate an output voltage of the power converter can include alternating the main switch between an on state that stores energy from an input of the power converter in the primary winding and an off state that discharges energy to an output of the power converter via a rectifier coupled to a secondary winding magnetically coupled to the primary winding, wherein alternating the main switch between the on and off states is responsive to a quasi-resonant flyback controller.

DETAILED DESCRIPTION

Figure 1:
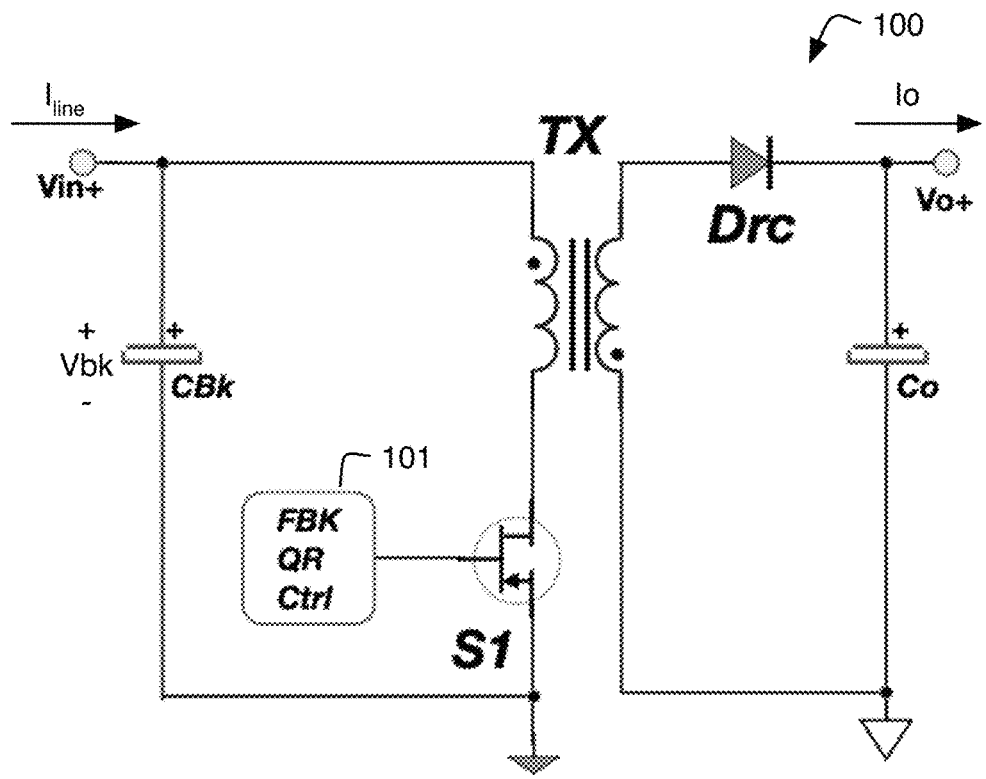
FIG. 1 illustrates a schematic diagram of a flyback converter.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified schematic diagram of a flyback converter 100. Flyback converter 100 receives an input voltage Vin+, which may be, for example, a rectified AC mains voltage, although it could be any suitable voltage source. A main switch S1 may be operated control circuit 101 to selectively cause current to flow from the input, through the primary winding of flyback transformer TX. More specifically, when switch S1 is turned on/closed, current may flow from the input, storing energy in flyback transformer TX. When switch S1 is turned off/opened, this current may be interrupted, causing a reversal of the voltage across the primary winding (and also the secondary winding) of flyback transformer TX, which in turn results in the energy stored in the flyback transformer being discharged to a load via output rectifier Drc as output current Io and output voltage Vo+.

Flyback transformer TX may also be thought of as a pair of coupled inductors. Rectifier Drc may be either a passive rectifier (e.g., diode) as shown, or may be an active switching device/synchronous rectifier, using a switching device such as a MOSFET (metal oxide semiconductor field effect transistor) or other suitable switching device. Main switch S1 may also be a MOSFET or other suitable switching device. An input bulk capacitor CBk may be provided to smooth the input voltage and/or act as an additional energy storage element that allows for more stable operation of the flyback converter. Bulk voltage Vbk (discussed below) appears across this capacitor. An output capacitor Co may be provided to smooth the output voltage, with the output voltage Vo appearing across this capacitor.

Control circuitry 101 may be any suitable flyback converter control circuitry, including a control loop that regulates the output voltage Vo by generating pulse width modulated (PWM) drive signals for main switch S1. In one example, flyback control circuitry 101 may implement a quasi-resonant (QR) control technique, although other control strategies can also be employed as appropriate for a given application. Such control circuits are known in the art and may be implemented using any suitable combination of analog, digital, or programmable circuitry including commercially available ASICs (application specific integrated circuits) specifically intended for flyback converter control. Additional components (not shown) may also be provided, such as active or passive clamp or energy recovery circuits on the primary side, additional coupled windings for generating bias voltages or other needed circuit voltages, resonant circuitry to improve operating efficiency, etc.

Figure 2:
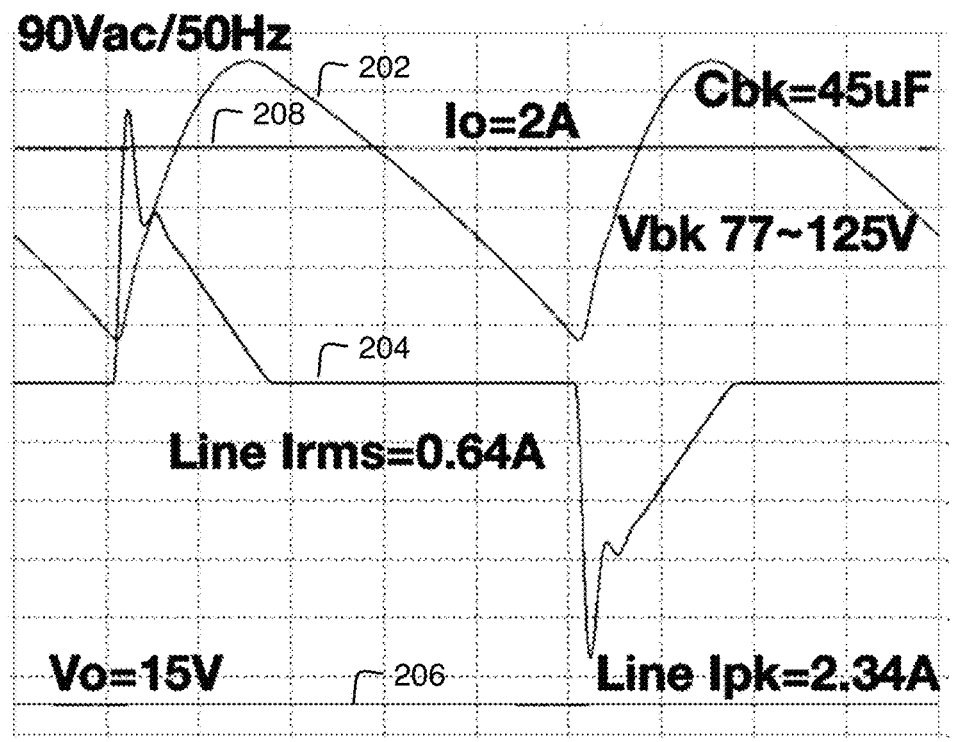
FIG. 2 illustrates various waveforms of a flyback converter as in FIG. 1.

FIG. 2 illustrates a plot 200 various simulated current and voltage waveforms of an exemplary flyback converter as described above in FIG. 1. More specifically, waveform 202 depicts the bulk capacitor voltage Vbk, which is also essentially the input voltage. Waveform 204 depicts the input line current Iline, which is effectively the combination of the current that charges capacitor CBk and the current through the primary winding of flyback transformer TX. Waveform 206 illustrates the output voltage Vo, which is a constant DC voltage, and waveform 208 illustrates the output current Io, which in the illustrated example is a constant DC current—although this need not be the case and may not be the case in a practical application. The values given in FIG. 2 for the respective voltages are examples for one exemplary flyback converter having a 30 W output rating, operating in a low line voltage condition (e.g., 90 Vac/50 Hz input, prior to rectification (not shown)). The teachings of the present disclosure are applicable to converters having other ratings and operating under other line conditions, but the illustrated example particularly illustrates certain issues with at least some flyback converter applications.

More specifically, it is not uncommon for power converters to be designed for operation over a relatively wide range of input voltage conditions. This allows a single converter to be used in North America (which has a nominal AC mains voltage of 120 Vac at 60 Hz), in Europe (which has a nominal AC mains voltage of 230 Vac at 50 Hz), and in Japan (which has a nominal AC mains voltage of 100V at 50 Hz or 60 Hz depending on the region of the country). Other regions employ voltages substantially similar to one of these nominal voltages. For at least some flyback converter applications, operating at a "worst case" low line condition (e.g., the illustrated 90 Vac/50 Hz) can result in input currents that exhibit substantial harmonic distortion and an undesirable power factor. In fact, even at high line conditions, these effects may be present. In many applications, such as converters having a power rating greater than about 75 W, power factor correction circuitry may be provided to mitigate these effects.

Figure 3:
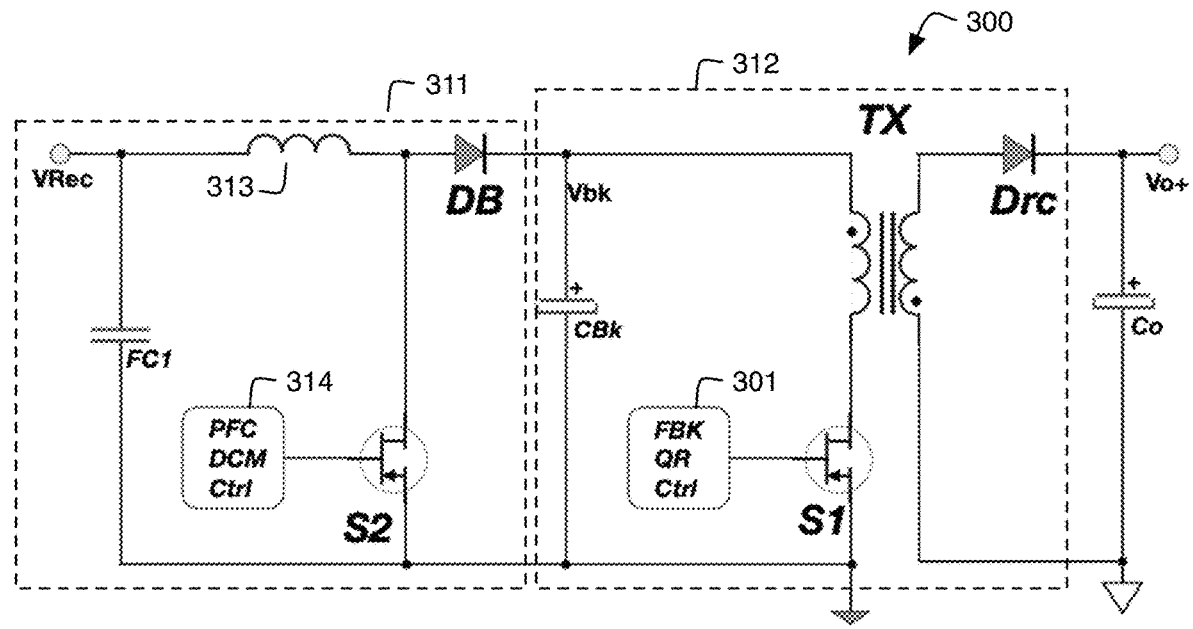
FIG. 3 illustrates a two-stage power factor corrected converter with a PFC stage and a flyback stage.

FIG. 3 illustrates a two-stage power factor corrected converter 300 with a PFC stage 311 and a flyback stage 312. Flyback stage 312 is substantially identical to flyback converter 100 described above with respect to FIG. 1. Flyback stage 312 receives as its input the output voltage of PFC stage 311. PFC stage 311 is effectively a boost converter that receives as its input a rectified AC voltage. A boost/PFC switch S2 is operated by PFC/boost control circuitry 314. When switch S2 is turned on/closed, a current is drawn from the input voltage source VRec, through boost inductor/choke 313—storing energy therein, through switch S2, returning to the input. When switch S2 is turned off/opened, the current through boost inductor/choke 313 cannot change instantaneously, and thus the energy stored in boost inductor/choke 313 generates a voltage across itself sufficient to drive current through boost diode DB to the output of PFC stage 311. The result of this operation is an input current that is substantially sinusoidal and substantially in phase with the rectified AC input voltage (VRec). PFC/boost control circuitry 314 may include a control loop that implements discontinuous current mode control (or any other suitable control strategy) to provide the boost/PFC function. Such control circuits are known in the art and may be implemented using any suitable combination of analog, digital, or programmable circuitry including commercially available ASICs (application specific integrated circuits) specifically intended for boost/PFC control.

Figure 4:
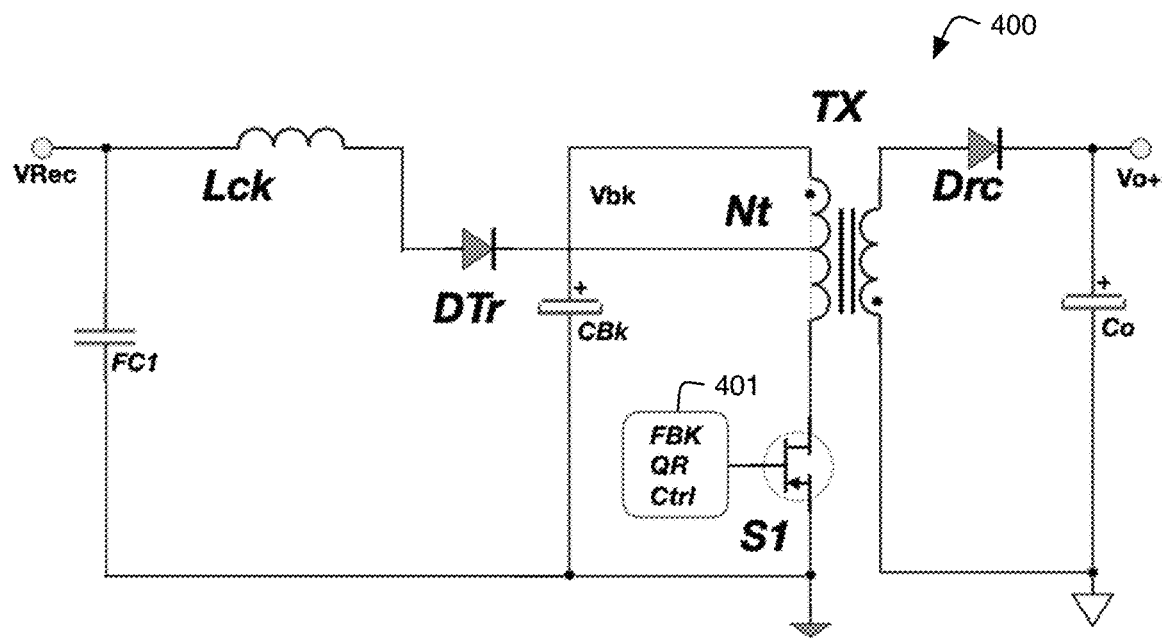
FIG. 4 illustrates a single-stage power factor corrected converter.

As noted above, power factor corrected converter 300 is a two-stage converter, meaning there is a first boost/PFC stage 311 with its own control circuitry 314 and switching device S2 and a second flyback stage 312 with its own control circuitry 301 and switching device S1. Such converters can be very effective; however, for some applications, the added cost and complexity of the additional controller and additional switching device may be undesirable. FIG. 4 illustrates one example of a single-stage power factor corrected converter 400 that eliminates the additional switching device S2 and controller 314 associated with boost/PFC stage 311. Other variations of this circuit are also possible.

In converter 400, boost/PFC inductor Lck is coupled via diode DTr to a center tap of the primary winding of flyback transformer TX. The tap may be assumed to be in the middle of the winding, such that there are an equal number of turns on either side of the tap, although other tap configurations could also be used. As a result of this configuration, the boost "stage" takes energy from input only when the instantaneous value of input voltage Vrec is greater than Vbk*(1−Nt), where Vbk is the voltage across the bulk capacitor CBk and Nt is the fraction of primary winding turns above the center tap. In this configuration, the boost factor is determined by the boost choke inductance Lck and the fraction of primary winding turns above the center tap Nt. However, such a configuration can result in an undesirably high bulk capacitor voltage Vbk when operating at high line voltage conditions. For example, it may be desirable to provide a 2~3× boost factor for operation at low line voltages, but at high line voltage conditions this can cause a Vbk of several hundred volts, requiring higher voltage ratings, larger size, and greater cost of the various converter components. Alternatively, for a boost ratio close to 1, good high line operating conditions can be achieved at the expense of having less bulk voltage Vbk under low line conditions, which can pose difficult operating conditions for the flyback converter that can make it more difficult to control.

Figure 5:
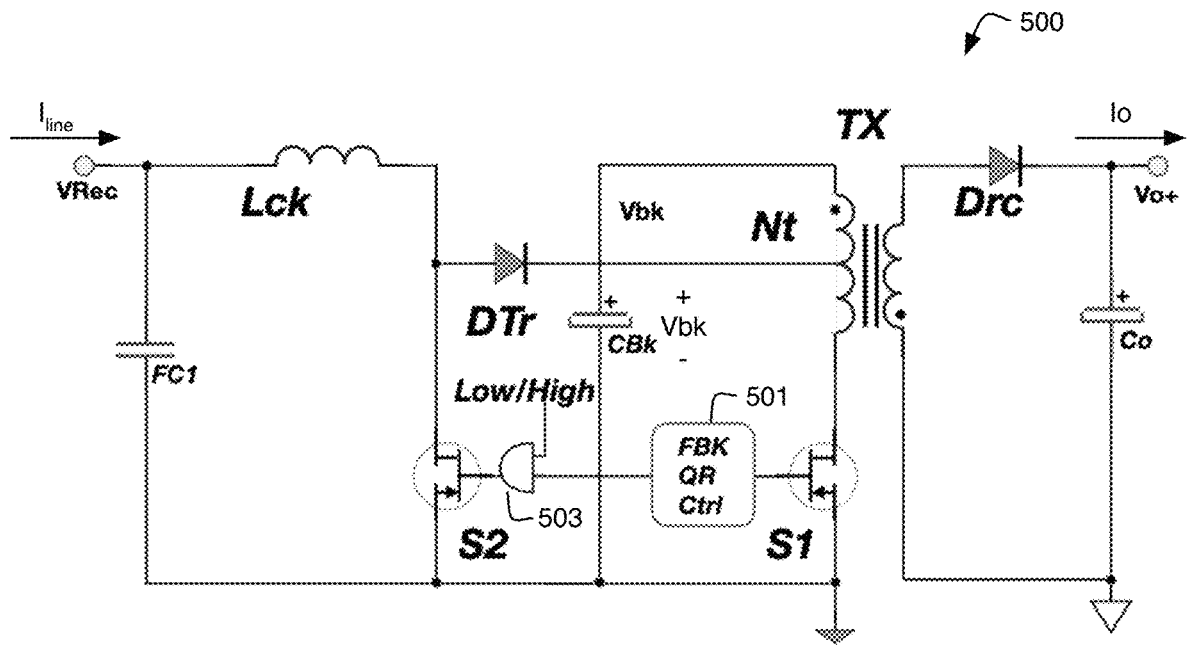
FIG. 5 illustrates a 1½ stage power factor corrected converter.

FIG. 5 illustrates a "1½ stage" power factor corrected converter 500 that may address some of the deficiencies of the circuit described above with respect to FIG. 4. As compared to converter 400 of FIG. 4, converter 500 includes an additional auxiliary switch S2 coupled between the junction of boost choke Lck and boost diode DTr and ground. Auxiliary switch S2 can be controlled using substantially the same control strategy as main switch S1, using flyback control circuitry 501, except that auxiliary switch S2 may be selectively enabled or disabled responsive to a high line vs. low line input condition. This selective enabling is depicted by AND gate 503, which receives the drive signal from flyback converter control circuitry 501 at one input and a low line/high line signal at its other input. This low line signal can be high when converter 500 is operating at a low line condition, in which case auxiliary switch S2 will be turned on when main switch S1 is turned on and turned off when switch S1 is turned off. Conversely, the low line signal can be low when converter 500 is operating at a high line condition. As a result, the output of AND gate 503 is held low, and switch S2 is disabled. This control arrangement is but one simplified example intended to depict the operational strategy, but any of a variety of circuits may be constructed to provide equivalent functionality.

The above-described circuitry allows for a boost factor close to 1 at high line conditions, when auxiliary switch S2 is disabled, because the boost stage operates only when Vrec is above Vbk*(1−Nt), as described above with respect to converter 400 of FIG. 4. During low line conditions, enough boost factor may be provided to increase the bulk voltage Vbk to provide better control stability and operation of the flyback stage. The amount of boost factor can be controlled by controlling the on time of auxiliary switch S2. In other words, S2 may be turned on with main switch S1 (as described above) but additional control circuitry coupled to the enable signal may be provided to turn off auxiliary switch S2 responsive to various parameters to shorten the total on time of auxiliary switch S2. In other words, auxiliary switch S2 is enabled only at low line, and its operation is synchronized with main switch S1, but it may have the same total on time as S1 or less on time, as provided by the particular control system embodiment. The control system can determine the on time for switch S2 responsive to one or more of the following inputs: on time of S1, input line RMS or average voltage, instantaneous line voltage or line phase, bulk capacitor voltage, output voltage, load or feedback position, and switching frequency of the converter. It should be understood that each of these inputs could be included or ignored and the chosen function optimized to a particular unit. The usual purpose of the control algorithm is to diminish the amount of boosting at light loads or at higher lines or to improve efficiency at lower lines and higher loads by increasing boosting or the amount power factor correction under such conditions.

An additional benefit of converter 500 is that the magnetic components (boost inductor/choke Lck and flyback transformer TX) become linked meaning that they can be integrated, e.g., constructed on a common magnetic core. This can provide advantages with respect to packaging (size, cost, etc.) as well as operating efficiency.

Figure 6:
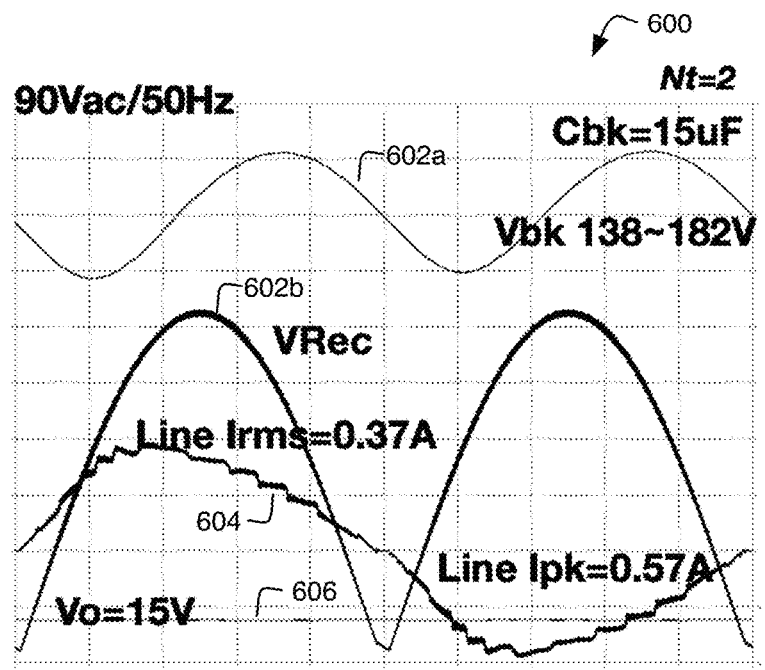
FIG. 6 illustrates various waveforms of a 1½ stage power factor corrected converter in a low line voltage condition.

FIG. 6 illustrates a plot 600 of various waveforms of a 1½ stage power factor corrected converter 500 in a low line voltage condition of 90 Vac/50 Hz. The illustrated waveforms were derived from simulation for one example circuit, and thus the exact values shown are not critical, but rather the basic nature of the waveforms should be observed. Waveform 602a illustrates the input AC voltage, with waveform 602b illustrating the rectified input AC voltage Vrec. Waveform 604 shows the input line current Iline, which can be seen as being substantially more sinusoidal and substantially more in phase with the rectified input voltage as compared to the conventional flyback converter waveforms discussed above with respect to FIG. 2. Waveform 606 illustrates the output voltage Vo.

Figure 7:
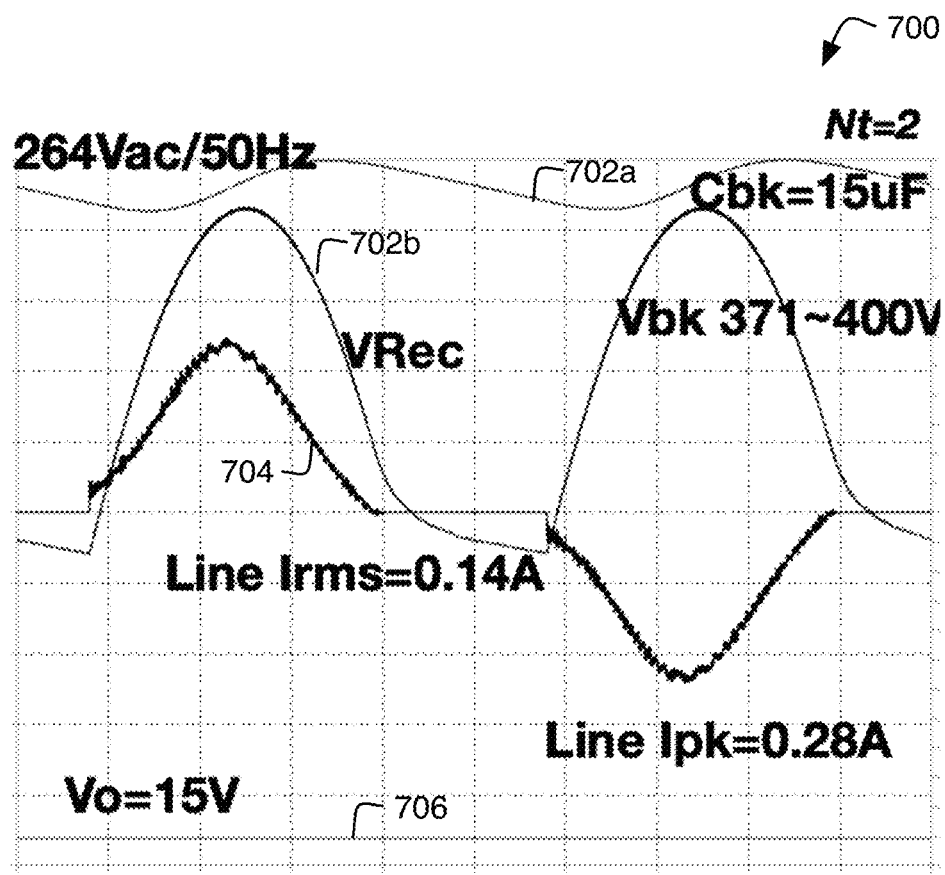
FIG. 7 illustrates various waveforms of a 1½ stage power factor corrected converter in a high line voltage condition.

FIG. 7 illustrates a plot 700 various waveforms of a 1½ stage power factor corrected converter 500 in a high line voltage condition of 264 Vac/50 Hz. As above, the illustrated waveforms were derived from simulation for one example circuit, and thus the exact values shown are not critical, but rather the basic nature of the waveforms should be observed. Waveform 702a illustrates the input AC voltage, with waveform 702b illustrating the rectified input AC voltage Vrec. Waveform 704 shows the input line current Iline, which can be seen as being substantially more sinusoidal and substantially more in phase with the rectified input voltage as compared to the conventional flyback converter waveforms discussed above with respect to FIG. 2. Waveform 706 illustrates the output voltage Vo.

The foregoing describes exemplary embodiments of a power factor corrected DC-DC converter. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power converter comprising:
a boost stage comprising a boost inductor, a boost diode, and an auxiliary switch, wherein a first boost inductor terminal is coupled to an input of the power converter that receives a rectified input voltage, and a second boost inductor terminal is coupled to an anode of the boost diode and a first terminal of the auxiliary switch;
a flyback stage comprising a flyback transformer having a primary winding and a secondary winding, a main switch coupled in series with the primary winding that switches to alternately store energy from the input of the power converter in the flyback transformer and discharge energy from the flyback transformer to an output of the power converter via a rectifier coupled to the secondary winding, wherein the primary winding has a center tap and a cathode of the boost diode is coupled to the center tap; and
control circuitry coupled to the main switch and the auxiliary switch that:
operates the main switch to regulate an output voltage of the power converter;
selectively enables the auxiliary switch responsive to a low line voltage condition at the input of the power converter and disables the auxiliary switch responsive to a high line voltage condition at the input of the power converter; and
operates the enabled auxiliary switch synchronously with the main switch.

2. The power converter of claim 1 wherein the control circuitry operates the auxiliary switch synchronously with the main switch by turning on the auxiliary switch at the same time as the main switch.

3. The power converter of claim 2 wherein the control circuitry operates the auxiliary switch synchronously with the main switch by turning off the auxiliary switch at the same time as the main switch.

4. The power converter of claim 2 wherein the control circuitry operates the auxiliary switch synchronously with the main switch by turning off the auxiliary switch before turning off the main switch.

5. The power converter of claim 4 wherein the control circuitry turns off the auxiliary switch responsive to one or more inputs selected from the group consisting of:
on time of the main switch;
input line RMS, average, or peak voltage;
instantaneous line voltage or line phase;
bulk capacitor voltage;
output voltage of the converter;
load or feedback position; and
converter switching frequency.

6. The power converter of claim 1 wherein the control circuitry implements a quasi-resonant flyback controller.

7. The power converter of claim 1 wherein the center tap is at the midpoint of the primary winding.

8. The power converter of claim 1 further comprising a bulk capacitor coupled across the series combination of the primary winding and the main switch.

9. A power converter comprising:
a power factor correction stage having an input coupled to an input of the power converter that receives a rectified input voltage and an output;
a flyback stage comprising a center-tapped primary winding magnetically coupled to a secondary winding and a main switch coupled in series with the primary winding, wherein the output of the power factor correction stage is coupled to the center tap of the primary winding, and an output of the power converter is coupled to the secondary winding of the flyback stage; and
control circuitry coupled to the main switch and an auxiliary switch in the power factor correction stage, that:
operates the main switch to regulate an output voltage of the power converter;
selectively enables the auxiliary switch responsive to a low line voltage condition at the input of the power converter; and
operates the enabled auxiliary switch synchronously with the main switch.

10. The power converter of claim 9 wherein the control circuitry operates the auxiliary switch synchronously with the main switch by turning on the auxiliary switch at the same time as the main switch.

11. The power converter of claim 10 wherein the control circuitry operates the auxiliary switch synchronously with the main switch by turning off the auxiliary switch at the same time as the main switch.

12. The power converter of claim 10 wherein the control circuitry operates the auxiliary switch synchronously with the main switch by turning off the auxiliary switch before turning off the main switch.

13. The power converter of claim 12 wherein the control circuitry turns off the auxiliary switch responsive to one or more inputs selected from the group consisting of:
on time of the main switch;
input line RMS, average, or peak voltage;
instantaneous line voltage or line phase;
bulk capacitor voltage;
output voltage of the converter;
load or feedback position; and
converter switching frequency.

14. The power converter of claim 9 wherein the control circuitry implements a quasi-resonant flyback controller.

15. The power converter of claim 9 wherein the center tap is at the midpoint of the primary winding.

16. A method performed by a control circuit of a power converter, the power converter having an input power factor correction stage coupled to an output flyback stage via a center-tapped primary winding of the flyback stage, the method comprising:
operating a main switch associated with the flyback stage to regulate an output voltage of the power converter;
selectively enabling an auxiliary switch associated with the power factor correction stage responsive to a low line voltage condition at the input of the power converter; and
operating the enabled auxiliary switch synchronously with the main switch.

17. The method of claim 16 wherein operating the auxiliary switch synchronously with the main switch comprises turning on the auxiliary switch at the same time as the main switch.

18. The method of claim 17 wherein operating the auxiliary switch synchronously with the main switch comprises turning off the auxiliary switch at the same time as the main switch.

19. The method of claim 17 wherein operating the auxiliary switch synchronously with the main switch comprises turning off the auxiliary switch before turning off the main switch.

20. The method of claim 19 further comprising turning off the auxiliary switch responsive to one or more inputs selected from the group consisting of:
on time of the main switch;
input line RMS, average, or peak voltage;
instantaneous line voltage or line phase;
bulk capacitor voltage;
output voltage of the converter;
load or feedback position; and
converter switching frequency.

21. The method of claim 16 wherein operating a main switch associated with the flyback stage to regulate an output voltage of the power converter comprises alternating the main switch between an on state that stores energy from an input of the power converter in the primary winding and an off state that discharges energy to an output of the power converter via a rectifier coupled to a secondary winding magnetically coupled to the primary winding, wherein alternating the main switch between the on and off states is responsive to a quasi-resonant flyback controller.

* * * * *